(12) United States Patent
Liu

(10) Patent No.: US 10,565,047 B2
(45) Date of Patent: Feb. 18, 2020

(54) TROUBLESHOOTING METHOD BASED ON NETWORK FUNCTION VIRTUALIZATION, AND DEVICE

(71) Applicant: HUAWEI TECHNOLOGIES CO., LTD., Shenzhen, Guangdong (CN)

(72) Inventor: Jianning Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 192 days.

(21) Appl. No.: 15/708,388

(22) Filed: Sep. 19, 2017

(65) Prior Publication Data

US 2018/0004589 A1   Jan. 4, 2018

Related U.S. Application Data

(63) Continuation of application No. PCT/CN2015/074580, filed on Mar. 19, 2015.

(51) Int. Cl.
  *G06F 11/00*  (2006.01)
  *G06F 11/07*  (2006.01)
  *H04L 12/24*  (2006.01)

(52) U.S. Cl.
  CPC ........ *G06F 11/079* (2013.01); *G06F 11/0709* (2013.01); *G06F 11/0712* (2013.01); *H04L 41/0631* (2013.01); *H04L 41/0654* (2013.01)

(58) Field of Classification Search
  CPC ............. G06F 11/0709; G06F 11/0712; G06F 11/079; G06F 11/0793; H04L 41/0631;
  (Continued)

(56) References Cited

U.S. PATENT DOCUMENTS 7,454,761 B1 * 11/2008 Roberts ................. G06F 11/079
                                                              714/25
7,490,073 B1 * 2/2009 Qureshi ................ G06F 11/079
                                                              706/50

(Continued)

FOREIGN PATENT DOCUMENTS

CN       101420326 A      4/2009
CN       101799776 A      8/2010
                    (Continued)

OTHER PUBLICATIONS

Translation of CN104170323, Oct. 10, 2010. <http://translationportal.epo.org/emtp/translate>. (Translation retrieved May 24, 2019).*

(Continued)

*Primary Examiner* — Joshua P Lottich
(74) *Attorney, Agent, or Firm* — Kilpatrick Townsend & Stockton LLP

(57) ABSTRACT

A troubleshooting method based on network function virtualization is provided, where the troubleshooting method may include: obtaining, by a first function management entity, fault information of a function entity; triggering, by the first function management entity, fault correlation processing according to the fault information, and formulating a troubleshooting policy according to a result of the fault correlation processing; and if the troubleshooting policy is formulated when troubleshooting time arrives, processing, by the first function management entity, a fault according to the troubleshooting policy; or if the troubleshooting policy is not formulated, processing, by the first function management entity, a fault according to a preset troubleshooting policy, where the preset troubleshooting policy is a policy formulated for a fault generated due to a reason of the function entity, so as to ensure that a service is not inter- (Continued)

rupted in a troubleshooting process, so that user experience is improved.

12 Claims, 8 Drawing Sheets

(58) Field of Classification Search
CPC .............. H04L 41/0654; H04L 41/0677; H04L 41/0681; H04L 41/0893
See application file for complete search history.

(56) References Cited

U.S. PATENT DOCUMENTS

| | | | | |
|---|---|---|---|---|
| 9,069,737 | B1* | 6/2015 | Kimotho | G06F 11/1484 |
| 2005/0223285 | A1* | 10/2005 | Faihe | G06F 11/0709 |
| | | | | 714/25 |
| 2010/0229022 | A1* | 9/2010 | Anand | G06F 11/079 |
| | | | | 714/2 |
| 2011/0170134 | A1* | 7/2011 | Murashima | G06F 11/0733 |
| | | | | 358/1.15 |
| 2012/0117425 | A1* | 5/2012 | Lam | G06Q 30/0251 |
| | | | | 714/26 |
| 2012/0297016 | A1* | 11/2012 | Iyer | G06F 9/5072 |
| | | | | 709/217 |
| 2013/0166135 | A1* | 6/2013 | Dunsdon | B64F 5/40 |
| | | | | 701/29.3 |
| 2014/0086040 | A1 | 3/2014 | Takahashi et al. | |
| 2014/0237297 | A1* | 8/2014 | Nagura | G06F 11/0727 |
| | | | | 714/39 |
| 2015/0370625 | A1* | 12/2015 | Nakajima | G06F 11/0709 |
| | | | | 714/37 |
| 2017/0187572 | A1 | 6/2017 | Wu et al. | |

FOREIGN PATENT DOCUMENTS

| | | |
|---|---|---|
| CN | 101867958 | 10/2010 |
| CN | 102904610 A | 1/2013 |
| CN | 103607349 A | 2/2014 |
| CN | 104170323 | 11/2014 |
| CN | 104199753 A | 12/2014 |
| CN | 104410672 A | 3/2015 |
| EP | 3119034 | 1/2017 |

OTHER PUBLICATIONS

International Search Report dated Dec. 30, 2015 corresponding to International Patent Application No. PCT/CN2015/074580.
International Search Report, dated Dec. 30, 2015, in International Application No. PCT/CN2015/074580 (4 pp.).
Office Action, dated Feb. 12, 2019, in Chinese Application No. 201580035071.8 (6 pp.).

* cited by examiner

US 10,565,047 B2

TROUBLESHOOTING METHOD BASED ON NETWORK FUNCTION VIRTUALIZATION, AND DEVICE

CROSS-REFERENCE TO RELATED APPLICATIONS

This application is a continuation of International Application No. PCT/CN2015/074580, filed on Mar. 19, 2015, the disclosure of which is hereby incorporated by reference in its entirety.

TECHNICAL FIELD

The present disclosure relates to the field of communications technologies, and in particular, to a troubleshooting method based on network function virtualization (NFV), and a device.

BACKGROUND

Initiated by thirteen main telecommunications operators in the world, NFV is an organization in which numerous device vendors, information technology (IT) vendors, and the like participate. The NFV is intended to define a requirement of network function virtualization of the operators and a related technical report, and expects to implement some network functions in a software form by means of an IT virtualization technology and using a general purpose high-performance and large-capacity server, a switch, and a storage device. For example, software and hardware separation may be implemented for various network devices, such as a server, a router, a storage device, and a switch, by using an NFV technology, and they may be deployed at a data center, a network node, a user home, or the like.

An existing NFV network architecture includes function nodes such as a network function virtualization infrastructure (NFVI), a virtualized network function (VNF), an element management (EM), a virtualized network function manager VNFM), a virtualized infrastructure manager (VIM), a network function virtualization orchestrator (NFVO), and an operations support system (OSS) or a business support system (BSS). The VNF runs on the NFVI, and one EM is corresponding to one or more VNFs.

When troubleshooting a VNF fault, the foregoing NFV network architecture usually uses a primary/secondary redundancy mode, that is, one VNF usually includes a primary VNF and a secondary VNF. When service transmission begins, the primary VNF is used, and when the primary VNF becomes faulty, a service on the primary VNF is handed over to the secondary VNF to ensure that the service runs normally.

However, except a reason of the primary VNF, a fault of the primary VNF may also be caused by another reason, for example, caused by another VNF associated with the primary VNF. Therefore, when the fault of the primary VNF is not caused by a reason of the primary VNF, even if the secondary VNF is started as a substitute, the fault cannot be fundamentally rectified. On the contrary, a precious resource is wasted, and service processing load of a management entity is increased.

To effectively identify a root fault of a VNF, the prior art provides a VNF fault correlation method. The method mainly includes: A VNF entity sends fault information to a VNFM, and the VNFM performs fault correlation processing on the VNF and another VNF within a management range of the VNFM; and if a reason of the root fault can be found, the VNFM is triggered to rectify the fault; or if a reason of the root fault cannot be found, the VNFM sends the fault information to an NFVO, and the NFVO troubleshoots the root fault at a whole network service (NS) layer, and if necessary, may further send the fault information to an OSS, and the OSS further performs fault correlation. Finally, a result of the fault correlation is returned to the VNFM, and the VNFM rectifies the fault.

In the foregoing fault correlation method, multiple function nodes may be needed to perform the fault correlation, and relatively long time is needed. If a carried service has an extremely strict requirement on a delay, performing the fault correlation may severely affect continuity of the service, the service may even be interrupted, and user experience is affected.

SUMMARY

For the foregoing disadvantage, the present invention provides a troubleshooting method based on network function virtualization and a device, so as to ensure that a service is not interrupted in a troubleshooting process, so that user experience is improved.

A first aspect of the present invention provides a troubleshooting method based on network function virtualization, where the troubleshooting method may include:

obtaining, by a first function management entity, fault information of a function entity;

triggering, by the first function management entity, fault correlation processing according to the fault information, and formulating a troubleshooting policy according to a result of the fault correlation processing; and if the troubleshooting policy is formulated when troubleshooting time arrives, processing, by the first function management entity, a fault according to the troubleshooting policy; or if the troubleshooting policy is not formulated, processing, by the first function management entity, a fault according to a preset troubleshooting policy, where the preset troubleshooting policy is a policy formulated for a fault generated due to a reason of the function entity.

With reference to the first aspect, in a first possible implementation, the triggering fault correlation processing and formulating a troubleshooting policy according to a result of the fault correlation processing includes: obtaining, by the first function management entity, fault information of another function entity within a management range, performing local fault correlation processing on the function entity and the another function entity within the management range to obtain local fault correlation information, and formulating, by the first function management entity, the troubleshooting policy according to the local fault correlation information.

With reference to the first aspect, in a second possible implementation, the triggering fault correlation processing and formulating a troubleshooting policy according to a result of the fault correlation processing includes: obtaining, by the first function management entity, fault information of another function entity within a management range, and performing local fault correlation processing on the function entity and the another function entity within the management range to obtain local fault correlation information; sending, by the first function management entity, the fault information and the local fault correlation information to a second function management entity, so that the second function management entity obtains fault information of a network function virtualization infrastructure (NFVI) and fault information of another function entity in a network service (NS), and performs external fault correlation processing on the function entity, the another function entity that is in the NS and that has a fault, and the NFVI to obtain external fault correlation information; and receiving, by the first function management entity, the external fault correlation information sent by the second function management entity, and formulating the troubleshooting policy according to the external fault correlation information.

With reference to the second possible implementation of the first aspect, in a third possible implementation, when the troubleshooting time arrives and the troubleshooting policy is not formulated, the formulating the troubleshooting policy according to the external fault correlation information includes: formulating, by the first function management entity, the troubleshooting policy according to the external fault correlation information and the preset troubleshooting policy for troubleshooting the fault.

With reference to the first aspect, in a fourth possible implementation, the triggering fault correlation processing and formulating a troubleshooting policy according to a result of the fault correlation processing includes: obtaining, by the first function management entity, fault information of another function entity within a management range, and performing local fault correlation processing on the function entity and the another function entity within the management range to obtain local fault correlation information; sending, by the first function management entity, the fault information and the local fault correlation information to a second function management entity, so that the second function management entity obtains fault information of a network function virtualization infrastructure (NFVI) and fault information of another function entity in a network service (NS), performs external fault correlation processing on the function entity, the another function entity that is in the NS and that has a fault, and the NFVI to obtain external fault correlation information, and formulates the troubleshooting policy based on the external fault correlation information; and receiving, by the first function management entity, the troubleshooting policy sent by the second function management entity.

With reference to the fourth possible implementation of the first aspect, in a fifth possible implementation, when the troubleshooting time arrives and the troubleshooting policy is not formulated, the formulating the troubleshooting policy based on the external fault correlation information includes: sending, by the first function management entity, a timeout notification message to the second function management entity, where the timeout notification message carries the preset troubleshooting policy for troubleshooting the fault, so that the second function management entity formulates the troubleshooting policy according to the preset troubleshooting policy and the external fault correlation information.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, in a sixth possible implementation, after the troubleshooting a fault according to a preset troubleshooting policy, the method further includes: if the troubleshooting policy is formulated, determining, by the first function management entity, whether the troubleshooting policy and the preset troubleshooting policy are the same; and if not the same, further processing, by the first function management entity, the fault according to the troubleshooting policy.

A second aspect of the present invention provides a function manager, where the function manager may include:
an obtaining unit, configured to obtain fault information of a function entity; and
a processing unit, configured to trigger fault correlation processing according to the fault information obtained by the obtaining unit, and formulate a troubleshooting policy according to a result of the fault correlation processing; and if the troubleshooting policy is formulated when troubleshooting time arrives, troubleshoot a fault according to the troubleshooting policy; or if the troubleshooting policy is not formulated, troubleshoot a fault according to a preset troubleshooting policy, where the preset troubleshooting policy is a policy formulated for a fault generated due to a reason of the function entity.

With reference to the second aspect, in a first possible implementation, the obtaining unit is specifically configured to obtain fault information of another function entity within a management range: and the processing unit is specifically configured to perform, according to the fault information and the fault information of the another function entity within the management range, local fault correlation processing on the function entity and the another function entity within the management range to obtain local fault correlation information, and formulate the troubleshooting policy according to the local fault correlation information.

With reference to the second aspect, in a second possible implementation, the obtaining unit is specifically configured to obtain fault information of another function entity within a management range; and the processing unit is specifically configured to perform local fault correlation processing on the function entity and the another function entity within the management range to obtain local fault correlation information; send the fault information and the local fault correlation information to a second function management entity, so that the second function management entity obtains fault information of a network function virtualization infrastructure (NFVI) and fault information of another function entity in a network service (NS), and performs external fault correlation processing on the function entity, the another function entity that is in the NS and that has a fault, and the NFVI to obtain external fault correlation information; and receive the external fault correlation information sent by the second function management entity, and formulate the troubleshooting policy according to the external fault correlation information.

With reference to the second possible implementation of the second aspect, in a third possible implementation, the processing unit is specifically configured to: when the troubleshooting time arrives and the troubleshooting policy is not formulated, formulate the troubleshooting policy according to the external fault correlation information and the preset troubleshooting policy for troubleshooting the fault.

With reference to the second aspect, in a fourth possible implementation, the obtaining unit is specifically configured to obtain fault information of another function entity within a management range; and the processing unit is specifically configured to perform local fault correlation processing on the function entity and the another function entity within the management range to obtain local fault correlation information; send the fault information and the local fault correlation information to a second function management entity, so that the second function management entity obtains fault information of an NFVI and fault information of another function entity in a network service (NS), performs external fault correlation processing on the function entity, the another function entity that is in the NS and that has a fault, and the NFVI to obtain external fault correlation information, and formulates the troubleshooting policy based on the external fault correlation information; and receive the troubleshooting policy sent by the second function management entity.

With reference to the fourth possible implementation of the second aspect, in a fifth possible implementation, the processing unit is specifically configured to: when the troubleshooting time arrives and the troubleshooting policy is not formulated, send a timeout notification message to the second function management entity, where the timeout notification message carries the preset troubleshooting policy for troubleshooting the fault, so that the second function management entity formulates the troubleshooting policy according to the preset troubleshooting policy and the external fault correlation information.

With reference to the second aspect, or the first possible implementation of the second aspect, or the second possible implementation of the second aspect, or the third possible implementation of the second aspect, or the fourth possible implementation of the second aspect, or the fifth possible implementation of the second aspect, in a sixth possible implementation, the function manager further includes: a determining unit, configured to: after the fault is troubleshooted according to the preset troubleshooting policy, if the troubleshooting policy is formulated, determine whether the troubleshooting policy and the preset troubleshooting policy are the same; and the processing unit is further configured to further troubleshoot the fault according to the troubleshooting policy if the determining unit determines that the troubleshooting policy and the preset troubleshooting policy are not the same.

A third aspect of the present invention provides a function manager, where the function manager may include at least one processor and at least one memory, and the processor and the memory are connected by using at least one bus;

the processor is configured to obtain fault information of a function entity; trigger fault correlation processing according to the fault information, and formulate a troubleshooting policy according to a result of the fault correlation processing; and if the troubleshooting policy is formulated when troubleshooting time arrives, troubleshoot a fault according to the troubleshooting policy; or if the troubleshooting policy is not formulated, troubleshoot a fault according to a preset troubleshooting policy, where the preset troubleshooting policy is a policy formulated for a fault generated due to a reason of the function entity; and the memory is configured to store the preset troubleshooting policy and the formulated troubleshooting policy.

With reference to the third aspect, in a first possible implementation, the processor is specifically configured to obtain fault information of another function entity within a management range, perform local fault correlation processing on the function entity and the another function entity within the management range to obtain local fault correlation information, and formulate the troubleshooting policy according to the local fault correlation information.

With reference to the third aspect, in a second possible implementation, the function manager is specifically configured to obtain fault information of another function entity within a management range; perform local fault correlation processing on the function entity and the another function entity within the management range to obtain local fault correlation information; send the fault information and the local fault correlation information to a second function management entity, so that the second function management entity obtains fault information of a network function virtualization infrastructure (NFVI) and fault information of another function entity in a network service (NS), and performs external fault correlation processing on the function entity, the another function entity that is in the NS and that has a fault, and the NFVI to obtain external fault correlation information; and receive the external fault correlation information sent by the second function management entity, and formulate the troubleshooting policy according to the external fault correlation information.

With reference to the second possible implementation of the third aspect, in a third possible implementation, the function manager is specifically configured to formulate the troubleshooting policy according to the external fault correlation information and the preset troubleshooting policy for troubleshooting the fault.

With reference to the third aspect, in a fourth possible implementation, the function manager is specifically configured to obtain fault information of another function entity within a management range; perform local fault correlation processing on the function entity and the another function entity within the management range to obtain local fault correlation information; send the fault information and the local fault correlation information to a second function management entity, so that the second function management entity obtains fault information of a network function virtualization infrastructure (NFVI) and fault information of another function entity in a network service (NS), performs external fault correlation processing on the function entity, the another function entity that is in the NS and that has a fault, and the NFVI to obtain external fault correlation information, and formulates the troubleshooting policy based on the external fault correlation information; and receive the troubleshooting policy sent by the second function management entity.

With reference to the fourth possible implementation of the third aspect, in a fifth possible implementation, the function manager is specifically configured to send a timeout notification message to the second function management entity, where the timeout notification message carries the preset troubleshooting policy for troubleshooting the fault, so that the second function management entity formulates the troubleshooting policy according to the preset troubleshooting policy and the external fault correlation information.

With reference to the third aspect, or the first possible implementation of the third aspect, or the second possible implementation of the third aspect, or the third possible implementation of the third aspect, or the fourth possible implementation of the third aspect, or the fifth possible implementation of the third aspect, in a sixth possible implementation, the processor is further configured to: if the troubleshooting policy is formulated, determine whether the troubleshooting policy and the preset troubleshooting policy are the same; and if not the same, further troubleshoot the fault according to the troubleshooting policy.

It can be seen that, in some technical solutions of the embodiments of the present invention, after receiving the fault information of the function entity, the first function management entity triggers the fault correlation processing and formulates the troubleshooting policy according to the result of the fault correlation processing. If the troubleshooting policy is formulated when the troubleshooting time arrives, the fault is troubleshooted according to the troubleshooting policy; or if the troubleshooting policy is not formulated, the fault is troubleshooted according to the preset troubleshooting policy, where the preset troubleshooting policy is only a policy formulated for a fault generated due to a reason of the function entity. Therefore, in the present invention, the troubleshooting time is set to ensure that a service is not interrupted in a troubleshooting process, so that user experience is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
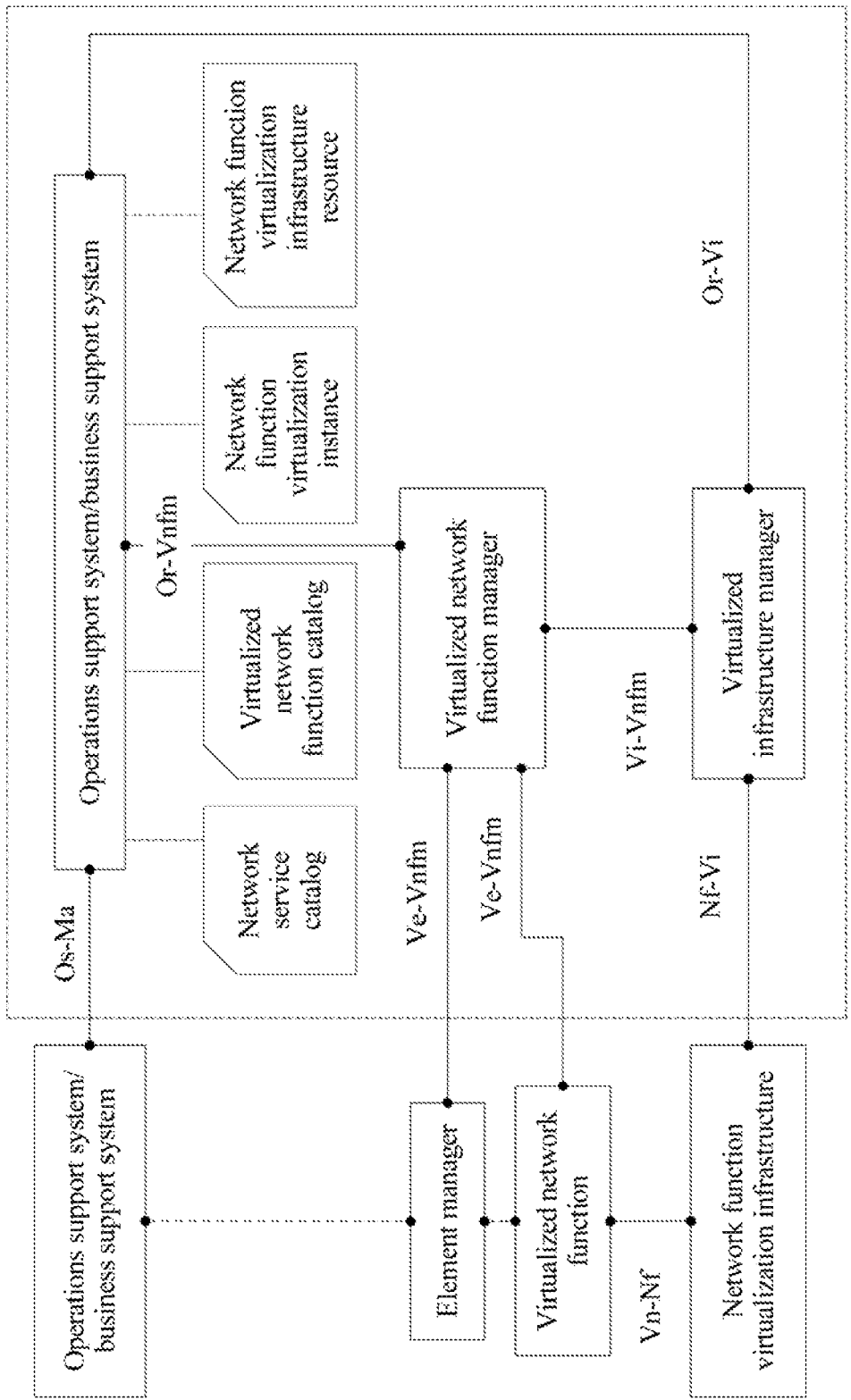
FIG. 1 is a schematic diagram of an NFV network architecture according to an embodiment of the present invention.

Embodiments of the present invention provide a troubleshooting method based on network function virtualization, so as to ensure that a service is not interrupted in a troubleshooting process, so that user experience is improved. The embodiments of the present invention correspondingly provide a function manager.

To make the invention objectives, features, and advantages of the present invention clearer and more comprehensible, the following describes the technical solutions in the embodiments of the present invention with reference to the accompanying drawings in the embodiments of the present invention. Apparently, the embodiments described are merely a part rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

First, an NFV network architecture on which the technical solutions of the embodiments of the present invention are based is described in detail with reference to FIG. 1.

A function entity and a function management entity of the NFV network architecture in FIG. 1, and functions of the function entity and the function management entity are as follows:

Business support system (BSS)/operations support system (OSS): initiates a service request and a resource needed by a service to an NFVO, and is responsible for troubleshooting.

Network function virtualization orchestrator (NFVO): receives the service request sent by the BSS/OSS, allocates and manages a resource, and monitors in real time a VNF, an NFVI resource, and running status information, such as fault information.

Virtualized network function manager (VNFM): is responsible for managing a VNF life cycle, for example, a start time, time to live, and VNF running status information, such as VNF fault information.

Virtualized infrastructure manager (VIM): is responsible for managing and allocating an NFVI resource, and monitoring and collecting NFVI running status information, such as fault information.

Element management (EM): is responsible for VNF management, including VNF performance monitoring, service configuration, and the like.

Virtualized network function (VNF): is a function entity that completes service forwarding or processing, and may be a virtualized mobility management entity (MME), a virtualized packet data network gateway (PGW), a vSwitch, a virtual firewall, or the like.

Network service (NS) catalog (NS catalog): stores all uploaded NSs, and supports establishment and management of deployment templates such as a network service descriptor (NSD), a VLD, and a VNFFGD.

Virtualized network function (VNF) catalog (VNF catalog): stores all uploaded VNF packets, and supports establishment and management of a virtualized network function descriptor (VNFD), a software image, and another list.

Network function virtualization NFV instance (NFV instances): stores information about all VNF instances and NS instances.

Network function virtualization infrastructure (NFVI) resource (NFVI resources): stores information about an available/reserved/allocated NFVI resource.

Related interactive interfaces further provided in the NFV network architecture in FIG. 1 are specifically as follows:

Ve-Vnfm: implements VNF life cycle management, and exchanges configuration information.

Or-Vnfm: requests a resource for VNF life cycle management, sends configuration information, and collects status information.

Vi-Vnfm: requests resource allocation, configures a virtualized resource, and exchanges status information.

Or-Vi; requests resource reservation and allocation, configures a virtualized resource, and exchanges status information.

Nf-Vi: implements specific resource allocation, exchanges status information of a virtualized resource, and configures a hardware resource.

Os-Ma: implements VNF life cycle management, service graph life cycle management, policy management, and the like.

Vn-Nf: is used by the NFVI to provide a practical execution environment for the VNF.

Based on the foregoing description, first, in an embodiment of a troubleshooting method based on network function virtualization in the present invention, the troubleshooting method based on network function virtualization may include: A first function management entity (for example, a VNFM) obtains fault information of a function entity (for example, a VNF); the first function management entity triggers fault correlation processing according to the fault information, and formulates a troubleshooting policy according to a result of the fault correlation processing; and if the troubleshooting policy is formulated when troubleshooting time arrives, the first function management entity troubleshoots a fault according to the troubleshooting policy; or if the troubleshooting policy is not formulated, the first function management entity troubleshoots a fault according to a preset troubleshooting policy, where the preset troubleshooting policy is a policy formulated for a fault generated due to a reason of the function entity.

Figure 2:
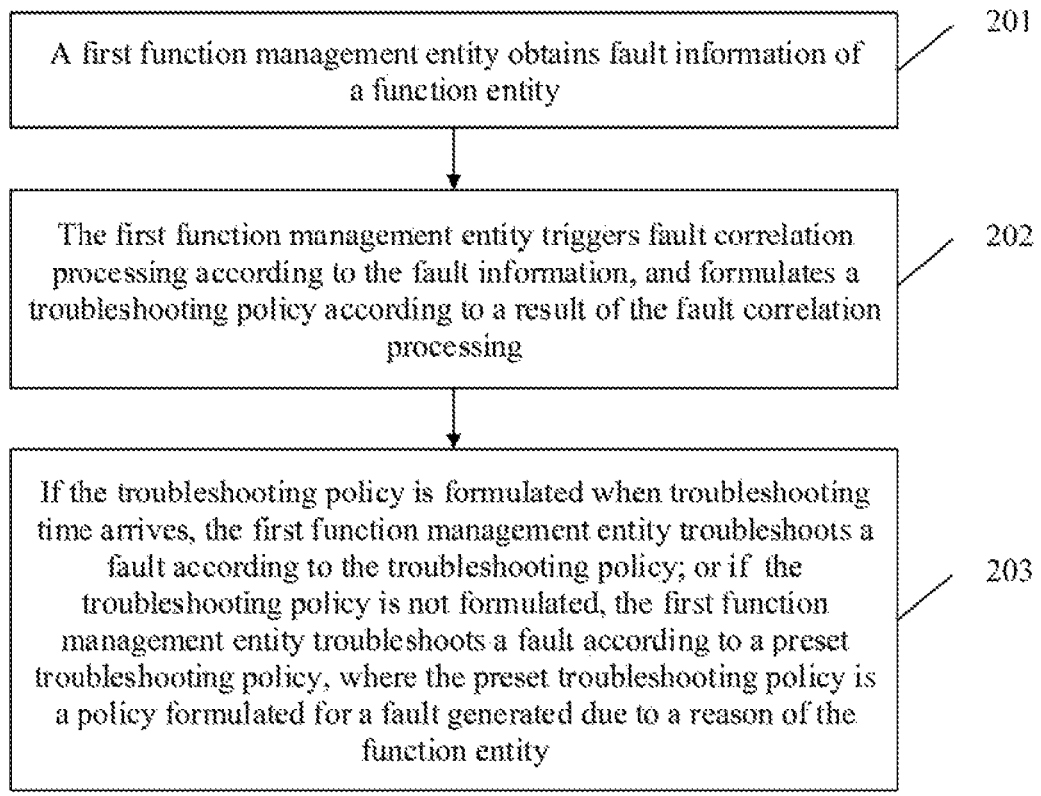
FIG. 2 is a schematic flowchart of a troubleshooting method based on network function virtualization according to an embodiment of the present invention.

Referring to FIG. 2, FIG. 2 is a schematic flowchart of a troubleshooting method based on network function virtualization according to an embodiment of the present invention. As shown in FIG. 2, the troubleshooting method based on network function virtualization according to this embodiment of the present invention may include:

201. A first function management entity obtains fault information of a function entity.

The first function management entity may obtain the fault information of the function entity in multiple manners, for example, by directly receiving the fault information sent by the function entity, or by receiving the fault information about the function entity sent by another function management entity, where the another function management entity has a function of monitoring a fault of the function entity.

Preferably, the foregoing fault information includes at least a fault identity (ID), a fault type, and fault data.

It should be noted that the first function management entity may be a VNFM, and the function entity may be a VNF.

202. The first function management entity triggers fault correlation processing according to the fault information, and formulates a troubleshooting policy according to a result of the fault correlation processing.

It should be noted that the first function management entity triggers the fault correlation processing and triggers a formulation of the troubleshooting policy. In addition, the first function management entity may perform the fault correlation processing and formulate the troubleshooting policy. Certainly, another function management entity may also perform the fault correlation processing and formulate the troubleshooting policy, or the first function management entity and another function management entity cooperate to perform the fault correlation processing and formulate the troubleshooting policy.

203. If the troubleshooting policy is formulated when troubleshooting time arrives, the first function management entity troubleshoots a fault according to the troubleshooting policy; or if the troubleshooting policy is not formulated, the first function management entity troubleshoots a fault according to a preset troubleshooting policy, where the preset troubleshooting policy is a policy formulated for a fault generated due to a reason of the function entity.

The troubleshooting time in the present invention is determined according to a minimum requirement of service continuity on a delay, so that a service is not interrupted in the troubleshooting time.

Whether the troubleshooting time arrives may be indicated in a timing manner. For example, a timer may be set in the first function management entity; and after receiving the fault information, the first function management entity triggers the formulation of the troubleshooting policy, simultaneously starts the timer to begin timing, and then determines whether the troubleshooting time arrives by determining whether a timing value of the timer satisfies the troubleshooting time. Alternatively, a timer is set in another function management entity, and the another function management entity has the function of monitoring a fault of the function entity; when detecting that the function entity becomes faulty, the another function management entity starts the timer to begin timing, and sends a timeout notification to the first function management entity when a timing value of the timer satisfies the troubleshooting time, so that after receiving the timeout notification, the first function management entity executes a corresponding fault policy by determining whether the troubleshooting policy is formulated.

It should be noted that the preset troubleshooting policy is mainly a policy formulated for a fault generated due to a reason of the function entity. In addition, the preset troubleshooting policy is pre-stored in the first function management entity, and may be stored in a manner of a list, and the list includes at least the fault ID, the fault type, and the preset troubleshooting policy, for example, as shown in Table 1:

TABLE 1

| Fault ID | Fault type | Preset troubleshooting policy |
|---|---|---|

Therefore, a matched preset troubleshooting policy is found from the list by using the fault ID and/or the fault type included in the fault information.

Correspondingly, the troubleshooting policy may also be stored in a manner of a list, and the list further includes the troubleshooting policy in addition to the fault ID and the fault type. The troubleshooting policy is a policy that is formulated according to the result of the fault correlation processing after fault correlation is performed and that is formulated mainly for a correlation fault caused by another function entity, an NFVI, hardware, or the like, as shown in Table 2:

TABLE 2

| Fault ID | Fault type | Troubleshooting policy |
|---|---|---|

It can be seen that, in this embodiment of the present invention, after obtaining the fault information of the function entity, the first function management entity triggers the fault correlation processing, and formulates the troubleshooting policy according to the result of the fault correlation processing; and if the troubleshooting policy is formulated within the troubleshooting time, the troubleshooting policy is used to perform troubleshooting, so as to implement comprehensive troubleshooting and fundamentally resolve a fault problem; or if the troubleshooting policy is not formulated, a corresponding preset troubleshooting policy for a fault generated due to a reason of the function entity is first used to perform troubleshooting to satisfy the minimum requirement of service continuity on a delay, so as to ensure that the service is not interrupted in a troubleshooting process, so that user experience is improved.

In some possible embodiments of the present invention, that the first function management entity triggers the formulation of the troubleshooting policy may include: The first function management entity obtains fault information of another function entity within a management range, and performs local fault correlation processing on the function entity and the another function entity within the management range to obtain local fault correlation information; and the first function management entity formulates the troubleshooting policy according to the local fault correlation information.

The first function management entity manages several function entities and may simultaneously receive fault information sent by multiple function entities. When performing fault correlation on the function entity, the first function management entity determines whether another function entity within the management range also has a fault, and if yes, obtains fault information of the another function entity, and then performs local fault correlation processing on the function entity and the another function entity that also has a fault according to all fault information. If it is found, by means of the local fault correlation processing, that the fault is caused by another function entity that has a fault, the troubleshooting policy may be formulated according to local fault correlation information obtained by the processing.

It should be noted that when performing local fault correlation, the first function management entity performs the fault correlation on one function entity and another function entity within the management range of the first function management entity. If a fault is caused by the another function entity, it indicates that the fault is caused by the another function entity. In this case, the function entity recovers to normal after a preset troubleshooting policy is used to troubleshoot the fault of the another function entity, that is, troubleshooting may not be necessarily performed on the function entity.

For example, before troubleshooting is performed on a function entity A, fault correlation is performed on the function entity A and a function entity B, and if it is obtained by processing that a fault of the function entity A is caused by a fault of the function entity B, the function entity A recovers to normal after a preset troubleshooting policy is used to perform troubleshooting on the function entity B.

In some other possible embodiments of the present invention, the triggering the formulation of the troubleshooting policy may include: The first function management entity obtains fault information of another function entity within a management range, and performs local fault correlation processing on the function entity and the another function entity within the management range to obtain local fault correlation information; the first function management entity sends the fault information and the local fault correlation information to a second function management entity, so that the second function management entity obtains fault information of an NFVI and fault information of another function entity in an NS, and performs external fault correlation processing on the function entity, the another function entity that is in the NS and that has a fault, and the NFVI to obtain external fault correlation information; and the first function management entity receives the external fault correlation information sent by the second function management entity, and formulates the troubleshooting policy according to the external fault correlation information.

After performing the local fault correlation processing on the function entity and the another function entity within the management range that has a fault, the first function management entity sends the fault information and the local fault correlation information to the second function management entity, and the second function management entity is an upper-layer function management entity of the first function management entity, and can perform fault correlation on the NFVI and all function entities that are in the NS and that have a fault.

Further, after the second function management entity performs the fault correlation processing on the function entity indicated by the fault information, the another function entity that is in the NS and that has a fault, and the NFVI, if a root fault is still not found by analysis, the fault information, the local fault correlation information, and NS fault correlation information are further sent to a third function management entity, so that the third function management entity performs correlation processing on the function entity and hardware to obtain external fault correlation information, and sends the external fault correlation information to the second function management entity.

It can be understood that, when the troubleshooting time arrives and the troubleshooting policy is not formulated, the final troubleshooting policy needs to formulated by referring to the preset troubleshooting policy used to troubleshoot the fault when the troubleshooting time arrives, that is, the troubleshooting policy is finally formulated according to the fault information, the local fault correlation information, the NS fault correlation information, hardware fault information.

As described above, the troubleshooting policy is formulated by the first function management entity. In some embodiments, the troubleshooting policy may be formulated by the second function management entity and then be sent to the first function management entity.

In some possible embodiments of the present invention, the triggering the formulation of the troubleshooting policy may include: The first function management entity obtains fault information of another function entity within a management range, and performs local fault correlation processing on the function entity and the another function entity within the management range to obtain local fault correlation information; the first function management entity sends the fault information and the local fault correlation information to a second function management entity, so that the second function management entity obtains fault information of an NFVI and fault information of another function entity in an NS, performs external fault correlation processing on the function entity, the another function entity that is in the NS and that has a fault, and the NFVI to obtain external fault correlation information, and formulates the troubleshooting policy based on the external fault correlation information; and the first function management entity receives the troubleshooting policy sent by the second function management entity.

Further, after the second function management entity performs the fault correlation processing on the function entity indicated by the fault information, the another function entity that is in the NS and that has a fault, and the NFVI, if a root fault is still not found by analysis, the fault information, the local fault correlation information, and NS fault correlation information are further sent to a third function management entity, so that the third function management entity performs correlation processing on the function entity and hardware to obtain external fault correlation information, formulates the troubleshooting policy according to the external fault correlation information, and sends the troubleshooting policy to the second function management entity.

Further, when the troubleshooting time arrives and the troubleshooting policy is not formulated, the first function management entity further sends a timeout notification message to the second function management entity, where the timeout notification message carries the preset troubleshooting policy for troubleshooting the fault, so that the second function management entity formulates the troubleshooting policy according to the preset troubleshooting policy and the external fault correlation information.

It can be understood that, when the troubleshooting time arrives and the troubleshooting policy is not formulated, the final troubleshooting policy needs to formulated by referring to the preset troubleshooting policy used to troubleshoot the fault when the troubleshooting time arrives, that is, the troubleshooting policy is finally formulated according to the fault information, the local fault correlation information, the NS fault correlation information, and hardware fault information.

In some possible embodiments of the present invention, after the first function management entity troubleshoots the fault according to the preset troubleshooting policy, the method further includes: If the troubleshooting policy is formulated, the first function management entity determines whether the troubleshooting policy and the preset troubleshooting policy are the same, and if not the same, the first function management entity further troubleshoots the fault according to the troubleshooting policy.

It can be understood that, if the troubleshooting policy has not been formulated when the troubleshooting time arrives, troubleshooting is first performed according to the preset troubleshooting policy to satisfy the minimum requirement of service continuity on a delay, so as to avoid a service interruption caused because no troubleshooting is performed after a troubleshooting delay is exceeded. However, at the same time, a formulation process of the troubleshooting policy is still ongoing. After the troubleshooting policy is formulated, if the troubleshooting policy is different from the preset troubleshooting policy originally used to perform the troubleshooting, it indicates that a root problem of the fault has not been resolved. Therefore, the fault needs to be further processed according to the troubleshooting policy, so as to ensure that the fault can be fundamentally rectified and perform comprehensive troubleshooting to ensure normal running of the service.

For ease of better understanding and implementation of the foregoing solution of the embodiment of the present invention, some specific application scenarios are used as examples in the following description.

Figure 3:
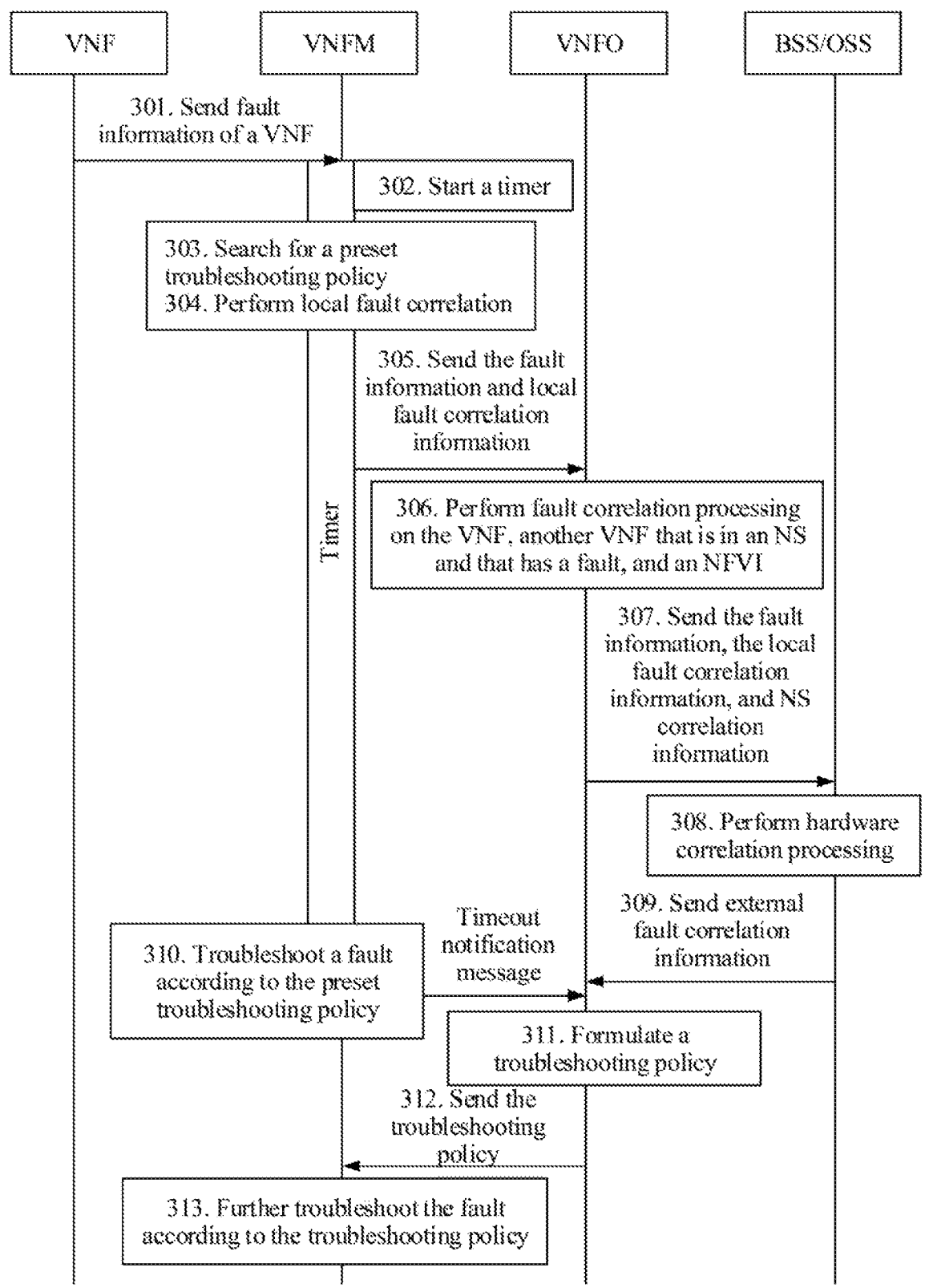
FIG. 3 is a schematic flowchart of a troubleshooting method based on network function virtualization according to another embodiment of the present invention.

Referring to FIG. 3, FIG. 3 is a schematic flowchart of a troubleshooting method based on network function virtualization according to another embodiment of the present invention. In the troubleshooting method based on network function virtualization corresponding to FIG. 3, a timer is set in a VNFM, and a troubleshooting policy is formulated by a VNFO. The troubleshooting method based on network function virtualization may include:

301. A VNF sends fault information of the VNF to the VNFM, where the fault information includes at least a fault ID, a fault type, and fault data.

Interaction between the VNF and the VNFM is implemented by using the foregoing Ve-Vnfm interface.

302. The VNFM receives the fault information of the VNF and starts the timer.

The timer is set in the VNFM. When obtaining the fault information, the VNFM starts the timer to begin timing, and simultaneously begins to perform the following steps 303 and 304.

It should be noted that steps 303 and 304 begin to be performed simultaneously, but are not necessarily completed simultaneously.

303. The VNFM searches for a corresponding preset troubleshooting policy according to the fault information.

For example, the foregoing Table 1 may be specifically shown as the following Table 3:

TABLE 3

| Fault ID | Fault type | Preset troubleshooting policy |
| --- | --- | --- |
| ID2 | The VNF is out of service. | 1. Create a new VNF.<br>2. Migrate a service to the new VNF. |

According to ID2 in the fault information, content of the preset troubleshooting policy is found from a list: Create a new VNF, and migrate a service to the new VNF. That is, the new VNF is created to substitute for the faulty VNP.

Certainly, after out-of-service of the VNF is found, a first step for out-of-service of the VNF may be first performed, that is, the new VNF is created. If the troubleshooting policy is not formulated when troubleshooting time arrives, the service is then handed over from the faulty VNF to the new VNF, so as to speed up troubleshooting.

304. The VNFM obtains fault information of another VNF, and performs local fault correlation on the VNF and the another VNF to obtain local fault correlation information.

It should be noted that steps 304 to 309 and step 311 are a process of formulating the troubleshooting policy.

305. The VNFM sends the fault information of the VNF and the local fault correlation information to the VNFO.

Interaction between the VNFM and the VNFO is implemented by using the foregoing Or-Vnfim interface.

306. The VNFO obtains fault information of at least one NFVI and fault information of another VNF in an NS, and performs fault correlation processing on the VNF, the another VNF that is in the NS and that has a fault, and the NFVI according to the fault information, the local fault correlation information, the fault information of the another VNF, and the fault information of the NFVI, to obtain NS correlation information.

The VNFO can monitor running statuses of the VNF and the NFVI in real time, and therefore, the VNFO can implement correlation at an NS layer.

307. The VNFO sends the fault information, the local fault correlation information, and the NS correlation information to an OSS/BSS.

308. The OSS/BSS obtains hardware fault information, and performs hardware correlation processing to obtain external fault correlation information.

309. The OSS/BSS sends the external fault correlation information to the VNFO.

310. If a timing value of the timer at the moment is troubleshooting time, the VNFM sends a timeout notification message to the VNFO, where the timeout notification message includes the preset troubleshooting policy; and troubleshoots a fault according to the preset troubleshooting policy.

After the preset troubleshooting policy is found, if the new VNF has been instantiated, in this step, only a service handover notification needs to be sent to the VNF to hand over a service running on the original faulty VNF to the new VNF.

It should be noted that the timer is started to begin timing in step 302, and simultaneously, the formulation of the troubleshooting policy begins in step 304; when execution of step 309 is completed, it is detected that the timing value of the timer is the troubleshooting time: however, at this moment, the troubleshooting policy is not formulated, and therefore, the fault needs to be first processed according to the preset troubleshooting policy.

It should be noted that the timing value of the timer being the troubleshooting time means that, for example, the troubleshooting time is set to 3 milliseconds, the timer begins timing from 0, and when the timing value is exactly 3 milliseconds, it indicates that the timing value of the timer is the troubleshooting time.

311. The VNFO formulates the troubleshooting policy according to the external fault correlation information and the preset troubleshooting policy.

It should be noted that in step 310, the timing value of the timer is already the troubleshooting time, the fault is first processed according to the preset troubleshooting policy, and simultaneously, the formulation of the troubleshooting policy continues based on step 309, and the troubleshooting policy is formulated in step 311.

312. The VNFO sends the troubleshooting policy to the VNFM.

313. The VNFM troubleshoots the fault according to the troubleshooting policy.

In this embodiment of the present invention, when the timing value of the timer is the troubleshooting time, the troubleshooting policy is not formulated. Therefore, the fault is first processed according to the preset troubleshooting policy, so as to ensure that the service is not interrupted due to overlong troubleshooting time. After the troubleshooting policy is formulated, the fault is further processed according to the troubleshooting policy, so as to ensure comprehensive troubleshooting and fundamentally resolve a fault problem.

Figure 4:
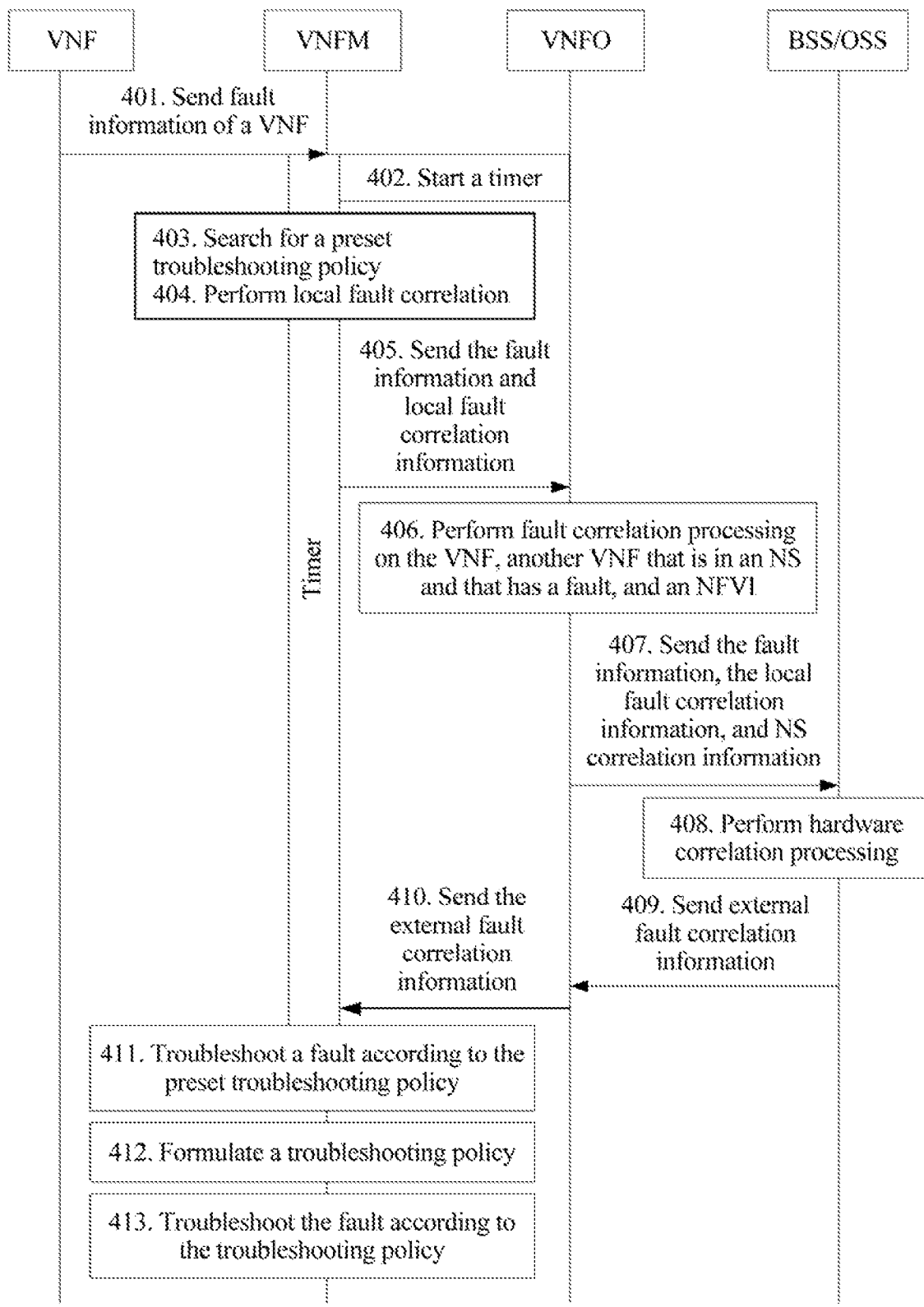
FIG. 4 is a schematic flowchart of a troubleshooting method based on network function virtualization according to another embodiment of the present invention.

Referring to FIG. 4, FIG. 4 is a schematic flowchart of a troubleshooting method based on network function virtualization according to another embodiment of the present invention. In the troubleshooting method based on network function virtualization corresponding to FIG. 4, a timer is set in a VNFM, and a troubleshooting policy is formulated by the VNFM. The troubleshooting method based on network function virtualization may include:

Steps 401 to 409 are the same as steps 301 to 309, and are not described herein any further.

410. The VNFO sends the external fault correlation information to the VNFM.

411. If a timing value of the timer at the moment is troubleshooting time, the VNFM troubleshoots a fault according to the preset troubleshooting policy.

After the preset troubleshooting policy is found, if the new VNF has been instantiated, in this step, only a service handover notification needs to be sent to the VNF to hand over a service running on the original faulty VNF to the new VNF.

It should be noted that the timer is started to begin timing in step 402, and simultaneously, the formulation of the troubleshooting policy begins in step 404; when execution of step 409 is completed, it is detected that the timing value of the timer is the troubleshooting time; however, at this moment, the troubleshooting policy is not formulated, and therefore, the fault needs to be first processed according to the preset troubleshooting policy.

It should be noted that the timing value of the timer being the troubleshooting time means that, for example, the troubleshooting time is set to 3 milliseconds, the timer begins timing from 0, and when the timing value is exactly 3 milliseconds, it indicates that the timing value of the timer is the troubleshooting time.

412. The VNFM formulates the troubleshooting policy according to the external fault correlation information and the preset troubleshooting policy.

It should be noted that if the troubleshooting policy is not formulated when the troubleshooting time arrives, and troubleshooting is already performed according to the preset troubleshooting policy at this moment, the preset troubleshooting policy already used to rectify the fault needs to be further considered in the formulation of the troubleshooting policy.

413. The VNFM troubleshoots the fault according to the troubleshooting policy.

A difference between this embodiment of the present invention and the embodiment shown in FIG. 3 is that the troubleshooting policy is formulated by the VNFM in this embodiment of the present invention.

Figure 5A:
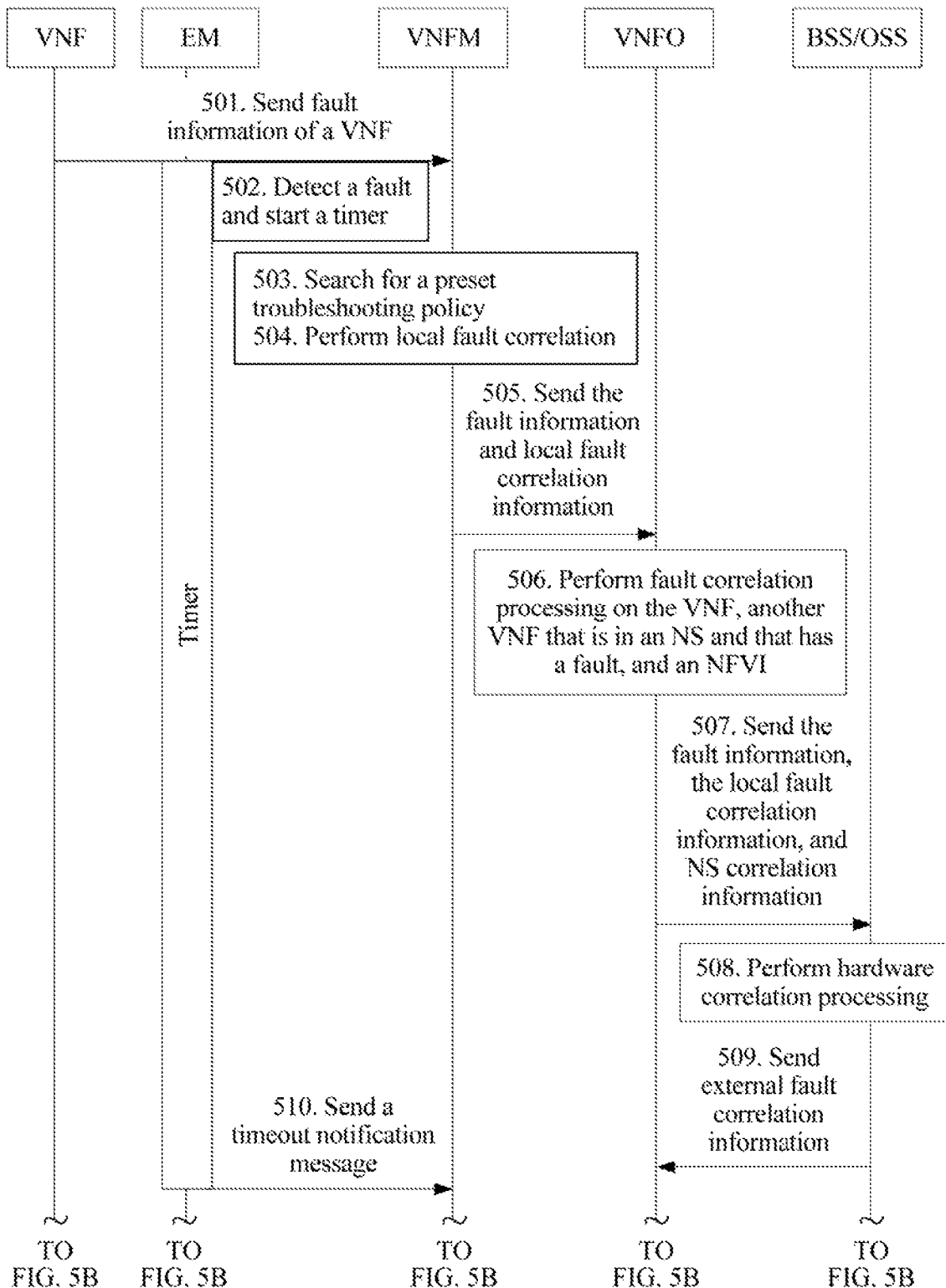
FIG. 5A and FIG. 5B are a schematic flowchart of a troubleshooting method based on network function virtualization according to another embodiment of the present invention.
Figure 5B:
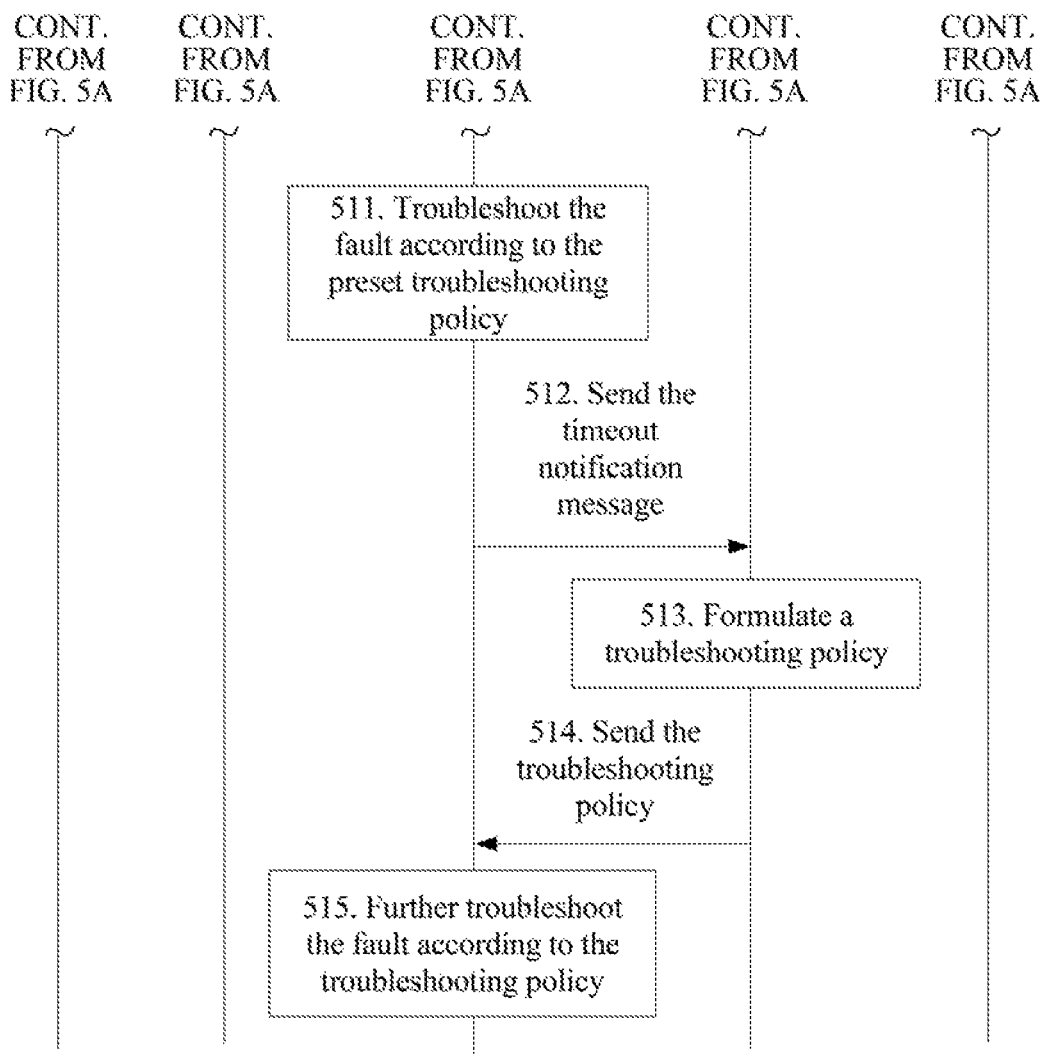

Referring to FIG. 5A and FIG. 5B, FIG. 5A and FIG. 5B are a schematic flowchart of a troubleshooting method based on network function virtualization according to another embodiment of the present invention. In the troubleshooting method based on network function virtualization corresponding to FIG. 5A and FIG. 5B, a timer is set in an EM, and a troubleshooting policy is formulated by a VNFO. The troubleshooting method based on network function virtualization may include:

501. A VNF sends fault information of the VNF to a VNFM, where the fault information includes at least a fault ID, a fault type, and fault data.

502. The EM detects whether the VNF has a fault, or the VNF sends the fault information of the VNF to the EM; and the EM starts the timer.

Steps 503 to 509 are the same as steps 303 to 309 in the embodiment shown in FIG. 3, and are not described herein any further.

510. The EM detects that a timing value of the timer is troubleshooting time, and sends a timeout notification message to the VNFM.

511. The VNFM receives the timeout notification message, and troubleshoots a fault according to the preset troubleshooting policy.

512. The VNFM sends the timeout notification message to the VNFO, where the timeout notification message carries the preset troubleshooting policy.

The foregoing steps 511 and 512 may be simultaneously performed.

513. The VNFO formulates the troubleshooting policy according to the preset troubleshooting policy and the external fault correlation information.

514. The VNFO sends the troubleshooting policy to the VNFM.

515. The VNFM troubleshoots the fault according to the troubleshooting policy.

In this embodiment of the present invention, the timer is set in the EM, and the troubleshooting policy is formulated by the VNFO. When detecting that the timing value of the timer satisfies the troubleshooting time, the EM sends the timeout notification message to the VNFM, and at this moment, the troubleshooting policy is not formulated. Therefore, the VNFM first troubleshoots the fault according to the preset troubleshooting policy, so as to ensure that the service is not interrupted due to overlong troubleshooting time. After the troubleshooting policy is formulated, the VNFM further troubleshoots the fault according to the troubleshooting policy, so as to ensure comprehensive troubleshooting and fundamentally resolve a fault problem.

Figure 6:
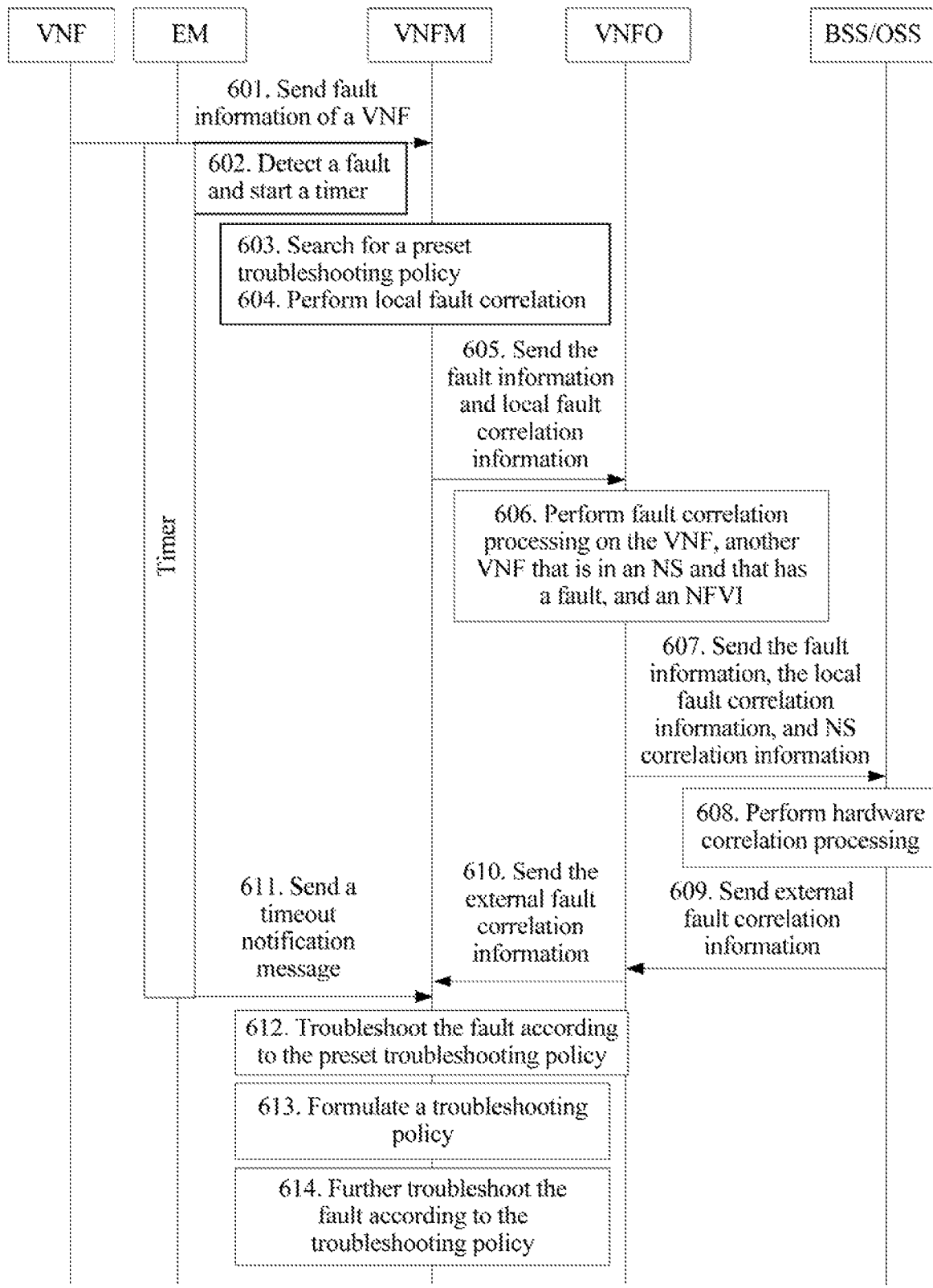
FIG. 6 is a schematic flowchart of a troubleshooting method based on network function virtualization according to another embodiment of the present invention.

Referring to FIG. 6, FIG. 6 is a schematic flowchart of a troubleshooting method based on network function virtualization according to another embodiment of the present invention. In the troubleshooting method based on network function virtualization corresponding to FIG. 6, a timer is set in an EM, and a troubleshooting policy is formulated by a VNFM. The troubleshooting method based on network function virtualization may include:

601. A VNF sends fault information of the VNF to the VNFM, where the fault information includes at least a fault ID, a fault type, and fault data.

602. The EM starts the timer after detecting that the VNF has a fault or after receiving the fault information sent by the VNF.

Steps 603 to 609 are the same as steps 503 to 509 in the embodiment shown in FIG. 5A and FIG. 5B, and are not described herein any further.

610. The VNFO sends the external fault correlation information to the VNFM.

611. The EM detects that a timing value of the timer is troubleshooting time, and sends a timeout notification message to the VNFM.

612. The VNFM receives the timeout notification message, and executes the preset troubleshooting policy.

613. The VNFM formulates the troubleshooting policy according to the preset troubleshooting policy and the external fault correlation information.

614. The VNFM further troubleshoots the fault according to the troubleshooting policy.

A difference between this embodiment of the present invention and the embodiment shown in FIG. SA and FIG. 5B is that the troubleshooting policy is formulated by the VNFM in this embodiment of the present invention.

Figure 7:
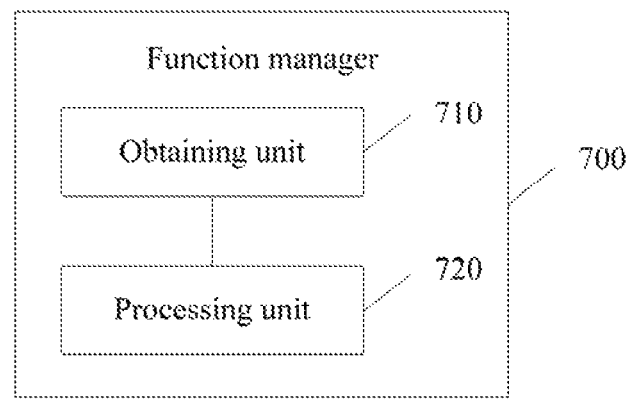
FIG. 7 is a schematic structural diagram of a function manager according to an embodiment of the present invention.

Referring to FIG. 7. FIG. 7 is a schematic structural diagram of a function manager according to an embodiment of the present invention. As shown in FIG. 7, a function manager 700 may include:

an obtaining unit 710, configured to obtain fault information of a function entity; and a processing unit 720, configured to trigger fault correlation processing according to the fault information obtained by the obtaining unit, and formulate a troubleshooting policy according to a result of the fault correlation processing; and if the troubleshooting policy is formulated when troubleshooting time arrives, troubleshoot a fault according to the troubleshooting policy; or if the troubleshooting policy is not formulated, troubleshoot a fault according to a preset troubleshooting policy, where the preset troubleshooting policy is a policy formulated for a fault generated due to a reason of the function entity.

It can be seen that, the obtaining unit 710 obtains the fault information of the function entity, and the processing unit 720 triggers the fault correlation processing according to the fault information and formulates the troubleshooting policy according to the result of the fault correlation processing. If the troubleshooting policy is formulated when the troubleshooting time arrives, the processing unit 720 troubleshoots the fault according to the troubleshooting policy; or if the troubleshooting policy is not formulated, the processing unit 720 troubleshoots the fault according to the preset troubleshooting policy, where the preset troubleshooting policy is only a policy formulated for a fault generated due to a reason of the function entity. Therefore, in the present invention, the troubleshooting time is set to ensure that a service is not interrupted in a troubleshooting process, so that user experience is improved.

In some possible embodiments of the present invention, the obtaining unit 710 is specifically configured to obtain fault information of another function entity within a management range. The processing unit 720 is specifically configured to perform, according to the fault information and the fault information of the another function entity within the management range, local fault correlation processing on the function entity and the another function entity within the management range to obtain local fault correlation information, and formulate the troubleshooting policy according to the local fault correlation information.

In some other possible embodiments of the present invention, the obtaining unit 710 is specifically configured to obtain fault information of another function entity within a management range. The processing unit 720 is specifically configured to perform, according to the fault information and the fault information of the another function entity within the management range, local fault correlation processing on the function entity and the another function entity within the management range to obtain local fault correlation information; send the fault information and the local fault correlation information to a second function management entity, so that the second function management entity obtains fault information of a network function virtualization infrastructure NFVI and fault information of another function entity in a network service NS, and performs external fault correlation processing on the function entity, the another function entity that is in the NS and that has a fault, and the NFVI to obtain external fault correlation information; and receive the external fault correlation information sent by the second function management entity, and formulate the troubleshooting policy according to the external fault correlation information.

Further, when the troubleshooting time arrives and the troubleshooting policy is not formulated, the processing unit 720 is specifically configured to formulate the troubleshooting policy according to the external fault correlation information and the preset troubleshooting policy for troubleshooting the fault.

In some other possible embodiments of the present invention, the obtaining unit 710 is specifically configured to obtain fault information of another function entity within a management range. The processing unit 720 is specifically configured to perform local fault correlation processing on the function entity and the another function entity within the management range to obtain local fault correlation information; send the fault information and the local fault correlation information to a second function management entity, so that the second function management entity obtains fault information of an NFVI and fault information of another function entity in a network service NS, performs external fault correlation processing on the function entity, the another function entity that is in the NS and that has a fault, and the NFVI to obtain external fault correlation information, and formulates the troubleshooting policy based on the external fault correlation information; and receive the troubleshooting policy sent by the second function management entity.

Further, when the troubleshooting time arrives and the troubleshooting policy is not formulated, the processing unit 710 is specifically configured to send a timeout notification message to the second function management entity, where the timeout notification message carries the preset troubleshooting policy for troubleshooting the fault, so that the second function management entity formulates the troubleshooting policy according to the preset troubleshooting policy and the external fault correlation information.

In some possible embodiments of the present invention, the function manager 700 further includes:

a determining unit, configured to: after the fault is troubleshooted according to the preset troubleshooting policy, if the troubleshooting policy is formulated, determine whether the troubleshooting policy and the preset troubleshooting policy are the same; and the processing unit 720 is further configured to further troubleshoot the fault according to the troubleshooting policy if the determining unit determines that the troubleshooting policy and the preset troubleshooting policy are not the same.

It can be seen that, when receiving the fault information, the function manager in this embodiment of the present invention triggers the fault correlation processing and formulates the troubleshooting policy according to the result of the fault correlation processing. Because the troubleshooting time is set according to a minimum requirement of service continuity on a delay, after the fault correlation processing is triggered, if the troubleshooting policy is formulated when the troubleshooting time arrives, the formulated troubleshooting policy may be directly used to troubleshoot the fault, so that a problem can be fundamentally resolved, and the fault can be rectified. If the troubleshooting policy is not formulated when the troubleshooting time arrives, the preset troubleshooting policy is first used to troubleshoot the fault, so as to ensure that the service is not interrupted. Afterward, after the troubleshooting policy is formulated, the formulated troubleshooting policy is further used to troubleshoot the fault, so as to eventually resolve the fault problem fundamentally and enable the service to run normally, while ensuring that the service is not interrupted.

Figure 8:
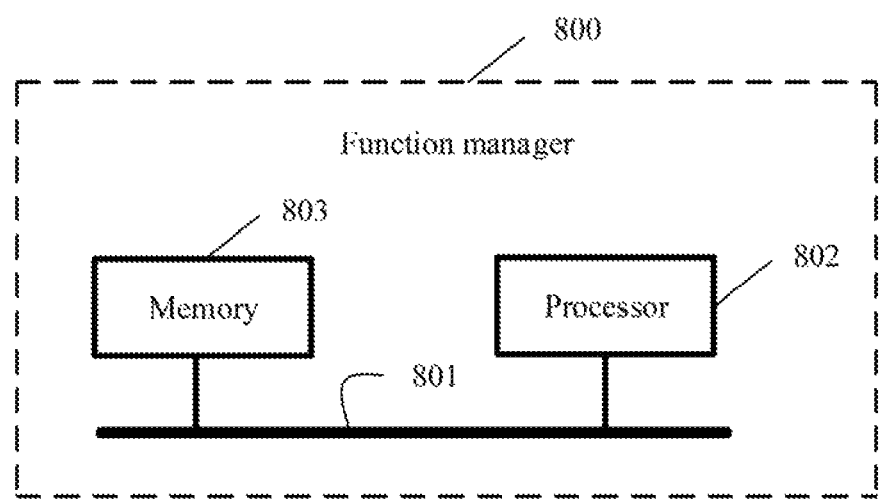
FIG. 8 is a schematic structural diagram of a function manager according to another embodiment of the present invention.

Referring to FIG. 8, FIG. 8 is a schematic diagram of a function manager 800 according to another embodiment of the present invention. The function manager 800 may include at least one bus 801, at least one processor 802 that is connected to the bus 801, and at least one memory 803 that is connected to the bus 801.

The processor 802 uses the bus 801 to invoke code stored in the memory 803, so as to obtain fault information of a function entity; trigger fault correlation processing according to the fault information, and formulate a troubleshooting policy according to a result of the fault correlation processing; and if the troubleshooting policy is formulated when troubleshooting time arrives, troubleshoot a fault according to the troubleshooting policy; or if the troubleshooting policy is not formulated, troubleshoot a fault according to a preset troubleshooting policy, where the preset troubleshooting policy is a policy formulated for a fault generated due to a reason of the function entity.

In some possible embodiments of the present invention, the processor 802 may be configured to obtain fault information of another function entity within a management range, perform local fault correlation processing on the function entity and the another function entity within the management range to obtain local fault correlation information, and formulate the troubleshooting policy according to the local fault correlation information.

In some possible embodiments of the present invention, the processor 802 may be configured to obtain fault information of another function entity within a management range; perform local fault correlation processing on the function entity and the another function entity within the management range to obtain local fault correlation information; send the fault information and the local fault correlation information to a second function management entity, so that the second function management entity obtains fault information of a network function virtualization infrastructure NFVI and fault information of another function entity in a network service NS, and performs external fault correlation processing on the function entity, the another function entity that is in the NS and that has a fault, and the NFVI to obtain external fault correlation information; and receive the external fault correlation information sent by the second function management entity, and formulate the troubleshooting policy according to the external fault correlation information.

In some possible embodiments of the present invention, when the troubleshooting time arrives and the troubleshooting policy is not formulated, the processor 802 may formulate the troubleshooting policy according to the external fault correlation information and the preset troubleshooting policy for troubleshooting the fault.

In some possible embodiments of the present invention, the processor 802 may be configured to obtain fault information of another function entity within a management range; perform local fault correlation processing on the function entity and the another function entity within the management range to obtain local fault correlation information; send the fault information and the local fault correlation information to a second function management entity, so that the second function management entity obtains fault information of an NFVI and fault information of another function entity in a network service NS, performs external fault correlation processing on the function entity, the another function entity that is in the NS and that has a fault, and the NFVI to obtain external fault correlation information, and formulates the troubleshooting policy based on the external fault correlation information; and receive the troubleshooting policy sent by the second function management entity.

In some possible embodiments of the present invention, when the troubleshooting time arrives and the troubleshooting policy is not formulated, the processor 802 may send a timeout notification message to the second function management entity, where the timeout notification message carries the preset troubleshooting policy for troubleshooting the fault, so that the second function management entity formulates the troubleshooting policy according to the preset troubleshooting policy and the external fault correlation information.

In some possible embodiments of the present invention, if the troubleshooting policy is formulated after the fault is troubleshooted according to the preset troubleshooting policy, the processor 802 may determine whether the troubleshooting policy and the preset troubleshooting policy are the same; and if the troubleshooting policy and the preset troubleshooting policy are not the same, further troubleshoot the fault according to the troubleshooting policy.

In some possible embodiments of the present invention, the memory 803 may be configured to store the troubleshooting policy and the preset troubleshooting policy.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are example embodiments, and the related actions and modules are not necessarily mandatory to the present invention.

For case of better implementation of the foregoing solutions of the embodiments of the present invention, the embodiments of the present invention further provide a related apparatus configured to implement the foregoing solutions.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a read-only memory (ROM), a random access memory (RAM), a removable hard disk, a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A troubleshooting method based on network function virtualization, comprising:
   obtaining, by a first function management entity, fault information of a function entity;
   triggering, by the first function management entity, fault correlation processing according to the fault information, and formulating a troubleshooting policy according to a result of the fault correlation processing, wherein the triggering of the fault correlation processing comprises:
   obtaining, by the first function management entity, fault information of another function entity within a management range, and performing local fault correlation processing on the function entity and the another function entity within the management range to obtain local fault correlation information; and
   formulating, by the first function management entity, the troubleshooting policy according to the local fault correlation information;
   when the troubleshooting policy is formulated when troubleshooting time arrives, processing, by the first function management entity, a fault according to the troubleshooting policy; and
   when the troubleshooting policy is not formulated, processing, by the first function management entity, a fault according to a preset troubleshooting policy, wherein the preset troubleshooting policy is a policy formulated for a fault generated due to a reason of the function entity.

2. The method according to claim 1, wherein:
   triggering the fault correlation processing and formulating a troubleshooting policy according to the result of the fault correlation processing comprises:
   sending, by the first function management entity, the fault information and the local fault correlation information to a second function management entity, to enable the second function management entity to:
      obtain fault information of a network function virtualization infrastructure (NFVI) and fault information of another function entity in a network service (NS), and
      perform external fault correlation processing on the function entity, the another function entity, and the NFVI to obtain external fault correlation information; and
   receiving, by the first function management entity, the external fault correlation information sent by the second function management entity, and formulating the troubleshooting policy according to the external fault correlation information.

3. The method according to claim 2, wherein:
   when the troubleshooting time arrives and the troubleshooting policy is not formulated, the formulating the troubleshooting policy according to the external fault correlation information comprises:
   formulating, by the first function management entity, the troubleshooting policy according to the external fault correlation information and the preset troubleshooting policy for troubleshooting the fault.

4. The method according to claim 1, wherein:
   the triggering fault correlation processing and formulating a troubleshooting policy according to a result of the fault correlation processing comprises:

obtaining, by the first function management entity, fault information of another function entity within a management range, and performing local fault correlation processing on the function entity and the another function entity within the management range to obtain local fault correlation information;

sending, by the first function management entity, the fault information and the local fault correlation information to a second function management entity, so that the second function management entity obtains fault information of a network function virtualization infrastructure NFVI and fault information of another function entity in a network service NS, performs external fault correlation processing on the function entity, the another function entity that is in the NS and that has a fault, and the NFVI to obtain external fault correlation information, and formulates the troubleshooting policy based on the external fault correlation information; and receiving, by the first function management entity, the troubleshooting policy sent by the second function management entity.

5. The method according to claim 4, wherein:
when the troubleshooting time arrives and the troubleshooting policy is not formulated, the formulating the troubleshooting policy based on the external fault correlation information comprises:
sending, by the first function management entity, a timeout notification message to the second function management entity, wherein the timeout notification message carries the preset troubleshooting policy for troubleshooting the fault, so that the second function management entity formulates the troubleshooting policy according to the preset troubleshooting policy and the external fault correlation information.

6. The method according to claim 1 wherein after the troubleshooting a fault according to a preset troubleshooting policy, the method further comprises:
if the troubleshooting policy is formulated, determining, by the first function management entity, whether the troubleshooting policy and the preset troubleshooting policy are the same; and
if the troubleshooting policy and the preset troubleshooting policy are not the same, further processing, by the first function management entity, the fault according to the troubleshooting policy.

7. A function manager, comprising:
at least one processor configured to
obtain fault information of a function entity;
trigger fault correlation processing according to the fault information, and formulate a troubleshooting policy according to a result of the fault correlation processing, wherein the triggering of the fault correlation processing comprises:
obtaining fault information of another function entity within a management range, and performing local fault correlation processing on the function entity and the another function entity within the management range to obtain local fault correlation information; and
formulating the troubleshooting policy according to the local fault correlation information;
when the troubleshooting policy is formulated when troubleshooting time arrives, troubleshoot a fault according to the troubleshooting policy; and when the troubleshooting policy is not formulated, troubleshoot a fault according to a preset troubleshooting policy, wherein the preset troubleshooting policy is a policy formulated for a fault generated due to a reason of the function entity; and
at least one memory coupled to the at least one processor by a bus and configured to store the preset troubleshooting policy and the formulated troubleshooting policy.

8. The function manager according to claim 7, wherein:
the function manager is configured to:
send the fault information and the local fault correlation information to a second function management entity, to enable the second function management entity to:
obtain fault information of a network function virtualization infrastructure (NFVI) and fault information of another function entity in a network service (NS), and
perform external fault correlation processing on the function entity, the another function entity that is in the NS and that has a fault, and the NFVI to obtain external fault correlation information; and
receive the external fault correlation information sent by the second function management entity, and formulate the troubleshooting policy according to the external fault correlation information.

9. The function manager according to claim 8, wherein:
the function manager is configured to formulate the troubleshooting policy according to the external fault correlation information and the preset troubleshooting policy for troubleshooting the fault.

10. The function manager according to claim 7, wherein:
the function manager is configured to:
send the fault information and the local fault correlation information to a second function management entity, to enable the second function management entity to
obtain fault information of a network function virtualization infrastructure (NFVI) and fault information of another function entity in a network service (NS),
perform external fault correlation processing on the function entity, the another function entity that is in the NS and that has a fault, and the NFVI to obtain external fault correlation information, and
formulate the troubleshooting policy based on the external fault correlation information; and
receive the troubleshooting policy sent by the second function management entity.

11. The function manager according to claim 10, wherein:
the function manager is configured to send a timeout notification message to the second function management entity, wherein the timeout notification message carries the preset troubleshooting policy for troubleshooting the fault, so that the second function management entity formulates the troubleshooting policy according to the preset troubleshooting policy and the external fault correlation information.

12. The function manager according to claim 7, wherein:
the processor is further configured to: if the troubleshooting policy is formulated, determine whether the troubleshooting policy and the preset troubleshooting policy are the same; and if the troubleshooting policy and the preset troubleshooting policy are not the same, further troubleshoot the fault according to the troubleshooting policy.

* * * * *